(12) United States Patent
Sim et al.

(10) Patent No.: US 11,312,314 B2
(45) Date of Patent: Apr. 26, 2022

(54) VEHICLE CAMERA

(71) Applicant: LG INNOTEK CO., LTD., Seoul (KR)

(72) Inventors: Gyu Cheol Sim, Seoul (KR); Min Woo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 266 days.

(21) Appl. No.: 16/637,642

(22) PCT Filed: Aug. 9, 2018

(86) PCT No.: PCT/KR2018/009099
§ 371 (c)(1),
(2) Date: Feb. 7, 2020

(87) PCT Pub. No.: WO2019/031876
PCT Pub. Date: Feb. 14, 2019

(65) Prior Publication Data
US 2020/0269771 A1    Aug. 27, 2020

(30) Foreign Application Priority Data
Aug. 11, 2017   (KR) .......................... 10-2017-0102183

(51) Int. Cl.
*G03B 17/56* (2021.01)
*G03B 17/02* (2021.01)
(Continued)

(52) U.S. Cl.
CPC .............. *B60R 11/04* (2013.01); *G03B 17/02* (2013.01); *G03B 17/561* (2013.01); *B60R 2011/0003* (2013.01); *B60R 2011/004* (2013.01)

(58) Field of Classification Search
USPC ......................................................... 396/419
See application file for complete search history.

(56) References Cited

U.S. PATENT DOCUMENTS 9,674,414 B1 * 6/2017 Molin ...................... G02B 7/02
10,288,831 B2 * 5/2019 Takahashi ............ H04N 5/2254
(Continued)

FOREIGN PATENT DOCUMENTS

CN    104348041 A    2/2015
CN    105100561 A    11/2015
(Continued)

*Primary Examiner* — Clayton E. LaBalle
*Assistant Examiner* — Warren K Fenwick
(74) *Attorney, Agent, or Firm* — Birch, Stewart, Kolasch & Birch, LLP

(57) ABSTRACT

The present invention relates to a vehicle camera. A vehicle camera according to one aspect comprises: a front case; a rear case having a space portion formed therein and coupled to the front case; a substrate module disposed in the space portion; and a terminal electrically connected to the substrate module and extending backward from the substrate module, wherein the rear case comprises a connector coupling portion and a bracket coupling portion which are formed on a rear surface thereof, wherein the connector coupling portion comprises a terminal hole for exposing the terminal to the outside, and the bracket coupling portion is disposed adjacent to the connector coupling portion and protrudes from the rear surface of the rear case so as to cover at least a portion of the outer circumferential surface of the connector coupling portion.

20 Claims, 7 Drawing Sheets

(51) Int. Cl.
    *B60R 11/04*    (2006.01)
    *B60R 11/00*    (2006.01)

(56) References Cited

U.S. PATENT DOCUMENTS

| | | | |
|---|---|---|---|
| 11,052,833 B2* | 7/2021 | Oba | G03B 17/08 |
| 2005/0168629 A1 | 8/2005 | Togawa et al. | |
| 2007/0051646 A1* | 3/2007 | Imoto | B60R 11/04 |
| | | | 206/316.2 |
| 2008/0024883 A1 | 1/2008 | Iwasaki | |
| 2011/0279675 A1* | 11/2011 | Mano | H04N 5/2257 |
| | | | 348/148 |
| 2013/0027607 A1 | 1/2013 | Jeon et al. | |
| 2015/0029337 A1* | 1/2015 | Uchiyama | H04N 7/18 |
| | | | 348/148 |
| 2017/0223245 A1 | 8/2017 | Park | |

FOREIGN PATENT DOCUMENTS

| | | |
|---|---|---|
| CN | 205609848 U | 9/2016 |
| JP | 10-274798 A | 10/1998 |
| JP | 2006-327512 A | 12/2006 |
| JP | 2017-102338 A | 6/2017 |
| KR | 10-2013-0013640 A | 2/2013 |
| KR | 10-2014-0059181 A | 5/2014 |
| KR | 10-2015-0014354 A | 2/2015 |
| KR | 10-2016-0016107 A | 2/2016 |

\* cited by examiner

VEHICLE CAMERA

CROSS REFERENCE TO RELATED APPLICATIONS

This application is the National Phase of PCT International Application No. PCT/KR2018/009099, filed on Aug. 9, 2018, which claims priority under 35 U.S.C. 119(a) to Patent Application No. 10-2017-0102183, filed in the Republic of Korea on Aug. 11, 2017, all of which are hereby expressly incorporated by reference into the present application.

DESCRIPTION OF INVENTION

Technical Field

The present embodiment relates to a vehicle camera.

Background Art

In recent years, as automobiles are popularized, automobiles have been rapidly spread across various classes and ages.

An automobile is equipped with a camera for the black box for protecting the vehicle or objective data of traffic accidents, a rear view camera of the vehicle that enables the driver to monitor the blind spot on the rear of the vehicle through the screen to ensure safety in reversing the vehicle, and the like.

The camera may comprise a lens module, a lens holder for supporting the lens module, an image sensor for converting an image of a subject collected in the lens module into an electrical signal, and the like. On the other hand, the housing that forms the outer appearance of the camera consists of a sealed structure all over the area to prevent internal components from being contaminated from foreign substances containing moisture. In particular, the watertightness of the camera should be considered as a top priority due to the nature of automobiles disposed outdoors.

In general, the housing is formed by coupling of a front case with a hole through which a lens module is exposed is formed, and a rear case disposed on a rear surface of the front case and accommodates electronic components therein. At this time, the coupling of the front case and the rear case may be achieved by coupling screws to screw holes being formed in the mutually corresponding areas, or by welding. Recently, an integrated case has also been proposed in order to reduce the manufacturing process and increase the watertightness.

In addition, the housing may be formed with a hole for coupling with a connector. The connector can be electrically connected to electronic components by disposing a portion of the connector inside the housing through the hole. Due to this, the connector can transmit and receive electrical signals necessary to operate the camera and the electronic components.

However, the area of the hole in which the connector is coupled requires a watertight structure to prevent the inflow of foreign substances between the connector and the hole, and the coupling between the connector and the housing shall also be rigidly secured. In particular, the connector must be firmly fixed to the housing and the internal electronic components, even in the event of external impact that occurs during the manufacture of vehicle cameras or vibration caused by vehicle movement so that the user's reliability with respect to the use of the product can be ensured.

DETAILED DESCRIPTION OF THE INVENTION

Technical Subject

The present invention has been proposed to improve the above problems, and to provide a vehicle camera that can firmly secure a connector that is electrically connected to an electronic component to the housing.

Technical Solution

A vehicle camera according to the present embodiment comprises a front case; a rear case having a space portion formed therein and coupled to the front case; a substrate module disposed in the space portion; and a terminal electrically connected to the substrate module and extending rearward of the substrate module, wherein the rear case comprises a connector coupling portion and a bracket coupling portion formed on a rear surface thereof, wherein the connector coupling portion comprises a terminal hole for exposing the terminal to the outside, and wherein the bracket coupling portion is disposed adjacent to the connector coupling portion, and protruded from the rear surface of the rear case so that at least a portion of the outer circumferential surface of the connector coupling portion is covered.

Advantageous Effects

Since the bracket coupling portion surrounds the peripheral area of the connector coupling portion through the present embodiment, there is an advantage of protecting the connector coupling portion and the connector from external impact. As a result, the connector coupling portion and the connector can be firmly fixed.

In addition, by forming the area between the bracket coupling portions, that is, the area where the connector coupling portion is disposed, to be lower than the region wherein the bracket coupling portion is formed at the rear surface of the rear case, there is an advantage of reducing the overall size of the product.

BEST MODE

Figure 1:
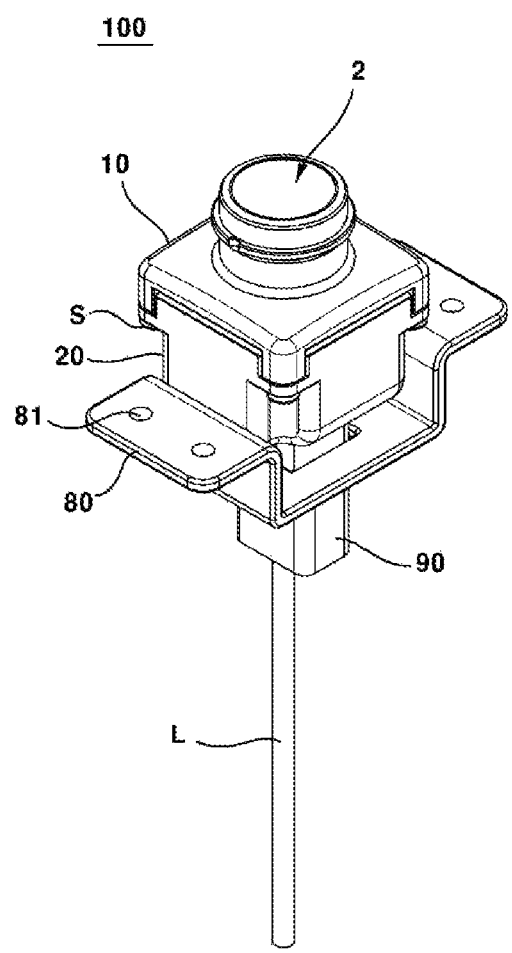
FIG. 1 is a perspective view of a vehicle camera according to an embodiment of the present invention.

Hereinafter, some embodiments of the present invention will be described with reference to exemplary drawings. In describing the reference symbols of the components in the drawings, the same components are denoted by the same reference numerals whenever possible, even if they are shown on other drawings.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled" or "jointed" between components.

Hereinafter, the description will be made with reference to the front direction in which the lens module is disposed in the vehicle camera, and the rear direction in which the connector is disposed.

Figure 2:
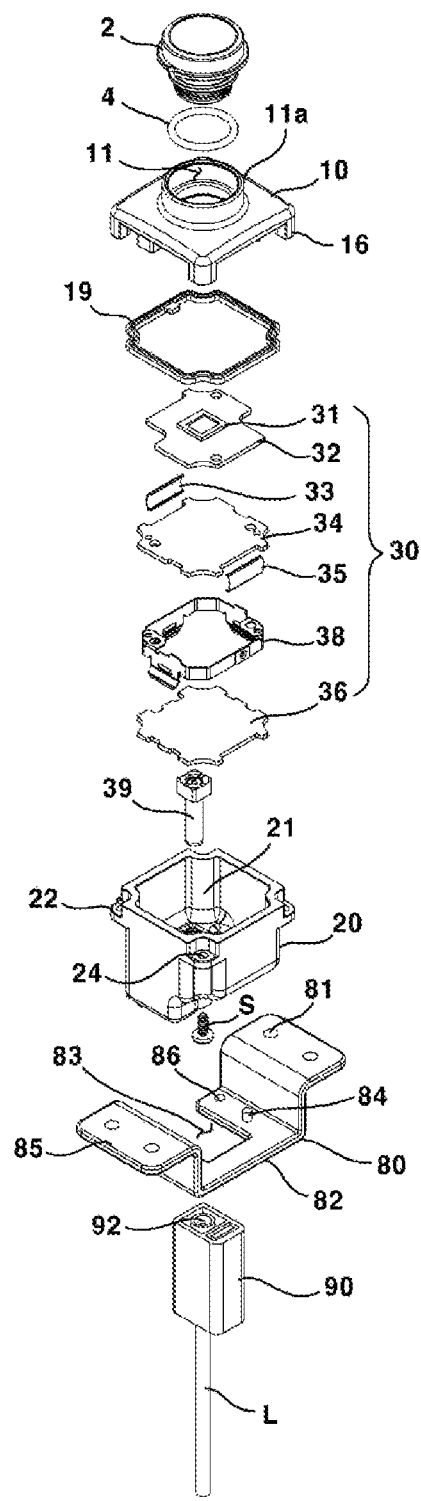
FIG. 2 is an exploded perspective view of the vehicle camera according to the embodiment of the present invention.

FIG. 1 is a perspective view of a vehicle camera according to an embodiment of the present invention; FIG. 2 is an exploded perspective view of the vehicle camera according to the embodiment of the present invention; and FIG. 3 is a cross-sectional view showing the internal configuration of the vehicle camera according to the embodiment of the present invention.

Figure 3:
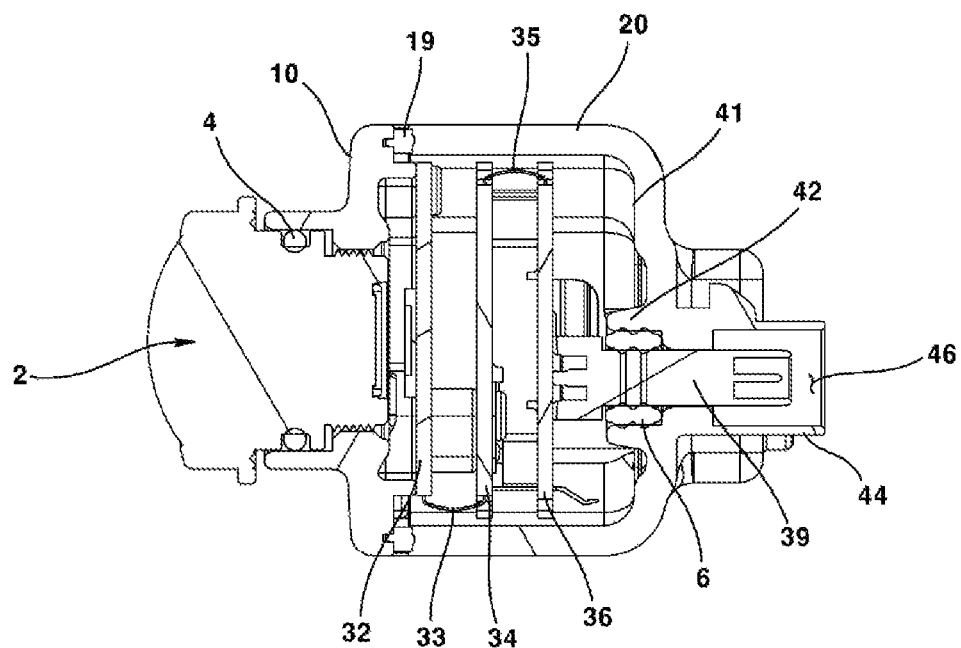
FIG. 3 is a cross-sectional view showing the internal configuration of the vehicle camera according to the embodiment of the present invention.

Referring to FIGS. 1 to 3, the outer appearance of the vehicle camera 100 according to an embodiment of the present invention is formed by coupling of a front case 10 and a rear case 20.

On the front surface of the front case 10, a lens mounting portion 11a wherein a lens module 2 is fitted is formed. A lens mounting hole 11 to which the lens module 2 is coupled is formed inside the lens mounting portion 11a. A sealing member 4 may be interposed between the inner circumferential surface of the lens mounting hole 11 and the lens module 2 to prevent foreign substances from flowing in through the lens mounting hole 11. The sealing member 4 may be formed in the shape of a ring and coupled to an outer circumferential surface of the lens module 2 coupled to the lens mounting hole 11.

The lens module 2 comprises at least one lens for collecting an image of an external subject. When an area exposed to the outside in the lens module 2 is called a front surface, a part of the rear side portion of the lens module 2 is fitted into the lens mounting hole 11, and may be disposed in a space portion 21 formed in the rear case 20. When the lens module 2 is coupled to the front case 10 through the lens mounting hole 11, an image sensor 31 and the lens module 2, which will be described later, may be coincidentally disposed in the optical axis direction.

The rear case 20 is coupled to the rear surface of the front case 10. A plurality of electronic components for driving the vehicle camera 100 may be disposed inside the rear case 20. A connector 90 electrically connected to the electronic components may be coupled to the rear surface of the rear case 20.

Figure 4:
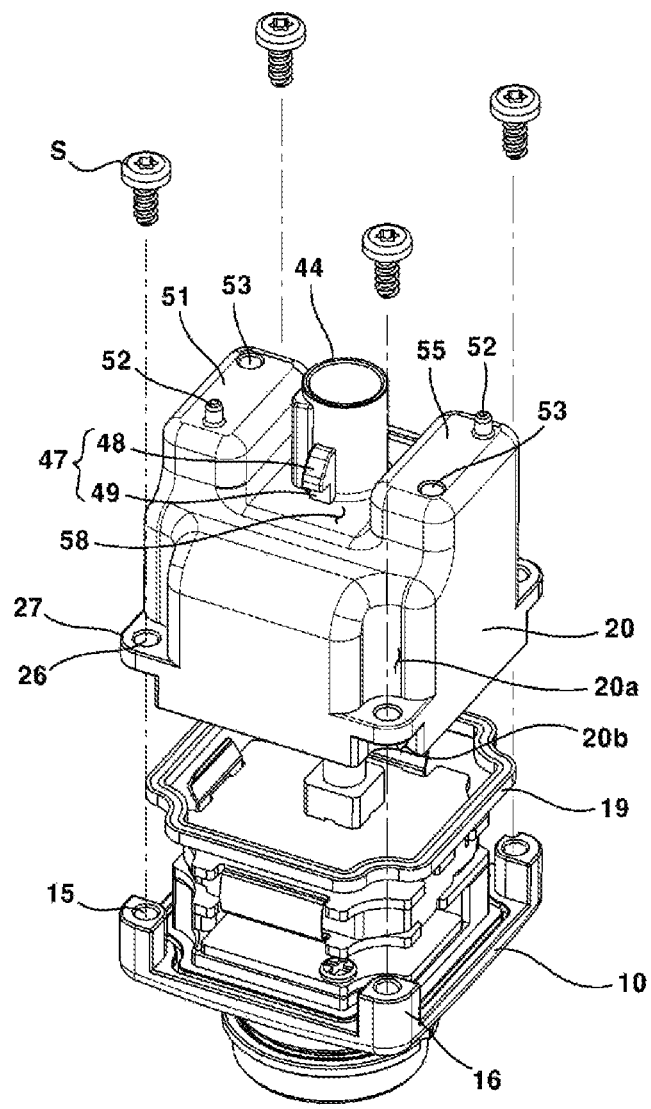
FIG. 4 is a perspective view showing an exploded view of a front case and a rear case according to the embodiment of the present invention.
Figure 5A:
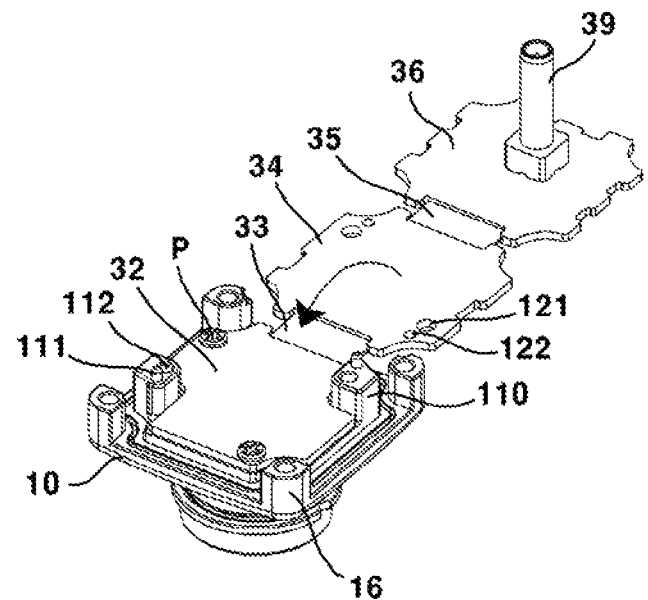
FIG. 5 is a flow chart showing the assembly of a substrate module according to the embodiment of the present invention.
Figure 5B:
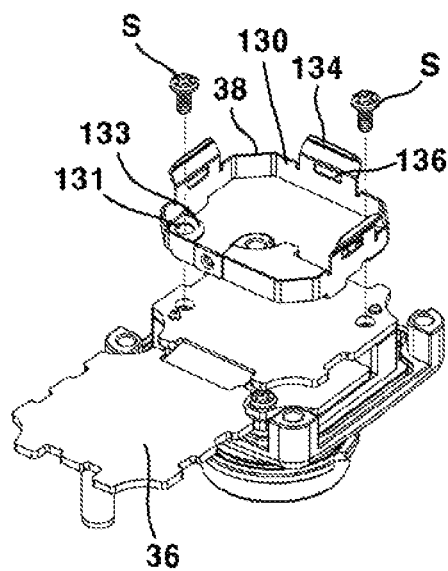
Figure 5C:
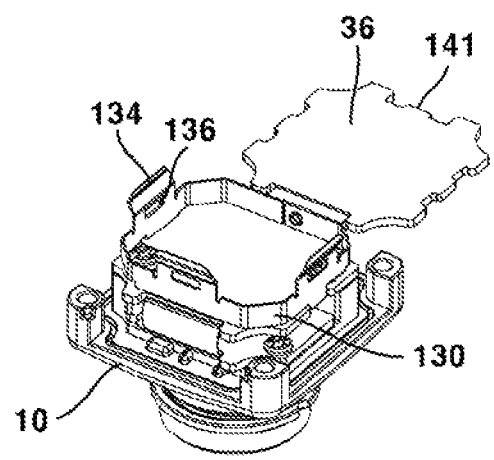
Figure 5D:
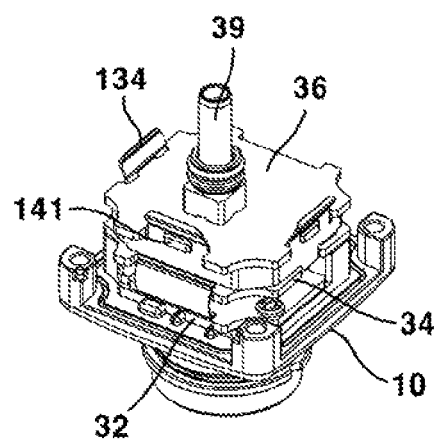

The front case 10 and the rear case 20 may be coupled via a screw S. In detail, a first coupling portion 16 protruding further toward the rear surface may be formed on the rear surface of the front case 10. Referring to FIG. 4, the first coupling portion 16 may be disposed at four corner areas of the rear surface of the front case 10 which is formed to have a rectangular cross-section. The first coupling portion 16 may protrude rearward from the rear surface of the front case 10, and at the rear surface thereof, a first screw hole 15 for coupling with the screw S may be formed. The first screw hole 15 is recessedly formed toward the front from the rear surface of the first coupling portion 16 so that the screw S can be inserted.

In addition, in an area of the front surface of the rear case 20 facing the first coupling portion 16, a second coupling portion 27 formed with a second screw hole 26 through which the screw S penetrates may be disposed. Grooves 20a may be formed in four side surface regions of the rear case 20 in which a portion of the outer circumferential surface is recessed inward. In addition, the second coupling portion 27 may be disposed in front of the groove 20a. The second screw hole 26 is formed to penetrate the rear surface from the front surface of the second coupling portion 27. Therefore, the screw S is coupled to penetrate the second screw hole 26 and the first screw hole 15, so that the rear case 20 and the front case 10 may be coupled to each other. Meanwhile, an accommodating groove 20b may be formed at a side surface of the rear case 20 facing the front of the second coupling portion 27 to accommodate the first coupling portion 16. The accommodating groove 20b may be formed to correspond to the cross-sectional shape of the first coupling portion 16 when viewed from the front side. Due to this, the front case 10 and the rear case 20 can be more compactly coupled.

A sealing member 11 may be disposed between the front case 10 and the rear case 20 to prevent foreign substances from flowing into the inside thereof. The sealing member 11 may be formed in the shape of a ring, so that its cross-sectional area may correspond to a cross-sectional area of the front case 10 or the rear case 20. More specifically, the cross-section of the sealing member 11 is formed to be corresponding to the edge region of the rear surface of the front case 10, the space generated between the front case 10 and the rear case 20 is shielded when the front case 10 and the rear case 20 are coupled. The sealing member 11 may be formed of an elastically deformable material.

FIG. 4 is a perspective view showing an exploded view of a front case and a rear case according to the embodiment of the present invention; and FIG. 5 is a flow chart showing the assembly of a substrate module according to the embodiment of the present invention.

Referring to FIGS. 2 to 5, in the vehicle camera 100, more specifically, in the space portion 21 formed inside the rear case 20, a plurality of electronic components is arranged for driving the vehicle camera 100. The plurality of electronic components comprises a substrate module 30 and a terminal 39 coupled to the rear surface of the substrate module 30 and electrically connected to the connector 90.

The substrate module 30 is disposed on the rear surface of the lens module 2 in the space portion 21. The substrate module 30 may comprise a first substrate 32 on which the image sensor 31 is mounted, a second substrate 34 disposed in rear of the first substrate 32, and a third substrate 36 disposed in rear of the second substrate 34. The first substrate 32 and the second substrate 34, and the second substrate 34 and the third substrate 36, may be electrically connected to each other through a first flexible substrate 33 and a second flexible substrate 35, respectively.

The image sensor 31 is disposed on the front surface of the first substrate 32. The image sensor 31 converts an image of a subject collected in the lens module 2 into an electrical signal to obtain a photographed object. To this end, the image sensor 31 may be arranged so that the optical axis thereof coincides with that of the lens module 2. The first substrate 32 is coupled to the rear surface of the front case 10. A hole through which a screw P passes may be formed in the first substrate 32, and a hole may also be formed in a region of the rear surface of the front case 10 facing the hole of the first substrate 32. Accordingly, the screw P may be coupled to the rear surface of the first substrate 32 and the front case 10, so that the first substrate 32 may be coupled to the rear surface of the front case 10.

Meanwhile, on a rear surface of the front case 10 spaced apart from the disposed area of the first substrate 32, a second substrate coupling portion 110 protruding from the rear surface may be formed. The second substrate coupling portion 110 may be multiply disposed spaced apart from each other at the rear surface of the front case 10. In addition, the protruding height of the second substrate coupling portion 110 may be formed to be higher than the height of side surface of the first substrate 32. The second substrate 34 and a shield can 38 may be coupled to the second substrate coupling portion 110.

In detail, a coupling protrusion 111 and a coupling hole 112 for coupling with the second substrate 34 and the shield can 38 may be formed on the rear surface of the second substrate coupling portion 110. The coupling protrusion 111 and the coupling hole 112 may be disposed adjacent to each other on the rear surface of the second substrate portion 110. The coupling protrusion 111 may protrude rearward from the rear surface of the second substrate coupling portion 110. The coupling hole 112 may be recessed toward the front so that the screw P is fitted at the rear surface of the first substrate coupling portion 110.

And, the second substrate 34 and the shield can 38 are coupled to the second substrate coupling portion 110. In detail, a first through hole 121 and a second through hole 122 may be formed in the areas of the second substrate coupling portion 110 facing the coupling hole 112 and the coupling protrusion 111, respectively. The first through hole 121 is formed to correspond to the cross-sectional shape of the coupling hole 112 and is disposed to face the coupling hole 112. The second through hole 122 has a cross section corresponding to the cross-sectional shape of the coupling protrusion 111 such that the coupling protrusion 111 is coupled thereto. The first through hole 121 and the second through hole 122 are disposed in the second substrate 34 to correspond to the number and positions of the second substrate coupling portion 110.

The shield can 38 is disposed between the second substrate 34 and the third substrate 36, thereby separating the third substrate 36 from the second substrate 34. The shield can 38 comprises; a body 130 forming the side surface; a first shield can coupling portion 133 disposed on the front surface of the body 130 so as to be coupled to the second substrate 34; and a second shield can coupling portion 134 disposed on the rear surface of the body 130 so as to be coupled to the third substrate 36. The body 130 is formed in the shape of a ring having a space therein. The cross-sectional shape of the body 130 may correspond to the shape of the edge region of the second substrate 34 and the third substrate 36.

The first shield can coupling portion 133 is coupled to the rear surface of the second substrate 34. In detail, the first shield can coupling portion 133 may comprise a first hole (not shown) facing the coupling protrusion 111 and the second through hole 122, and a second hole 131 facing the coupling hole 112 and the first through hole 121. The first shield can coupling portion 133 may be provided in plurality corresponding to the number of the second substrate coupling portion 110.

Therefore, when the shield can 38 is coupled to the rear surface of the second substrate 34, the coupling protrusion 111 is coupled to the second through hole 122 and the first hole. Then, the screw S penetrates through the first through hole 121 and the second hole 131, so that the shield can 38 and the second substrate 34 may be coupled to the rear surface of the front case 10.

The second shield can coupling portion 134 extends rearward from the rear surface of the body 130. The second shield can coupling portion 134 may have a third substrate coupling hole 135 penetrating from the inner surface to the outer surface. And, in the rear side region of the third substrate coupling hole 136 of the inner surface of the second shield can coupling portion 134, an inclined surface tending to face more outward as it travels rearward may be formed. On the other hand, the second shield can coupling portion 134 is provided in plurality, so that it may be disposed spaced apart from each other along the edge of the rear surface of the body 130.

In addition, a rib 141 protruding from the side surface of the third substrate 141 may be formed in an area of the side surface of the third substrate 141 facing the third substrate coupling hole 135. Therefore, when the third substrate 141 is coupled to the rear surface of the shield can 38, the rib 141 may be coupled to the third substrate coupling hole 135. The ribs 141 may be provided in plural to correspond to the number of the third substrate coupling holes 135, and may be disposed spaced apart from each other along the side surface of the third substrate 141.

Therefore, by the shield can 38, the second substrate 34 and the third substrate 36 may be respectively disposed on the front and rear surfaces of the shield can 38 to be spaced apart from each other. The thickness of the shield can 38 may be set to form a distance that does not interfere with each other considering the height of the electronic component disposed on the second substrate 34 or the third substrate 36. In addition, the third substrate 36 may be more easily hook-coupled to the shield can 38 by the inclined surface of the second shield can coupling portion 134.

A terminal 39 electrically connected to the connector 90 is coupled to the rear surface of the third substrate 36. The terminal 39 is mounted on the rear surface of the third substrate 36, and when coupled with the connector 90, electrical signals necessary for driving may be transmitted and received to and from the substrate module 30 and the lens module 10, or it may be supplied with power from the outside. The terminal 39 has a shape protruding rearward from the rear surface of the third substrate 36, and a sealing part 6 (FIG. 3) in the shape of a ring may be disposed on an outer circumferential surface of the terminal 39.

Figure 6:
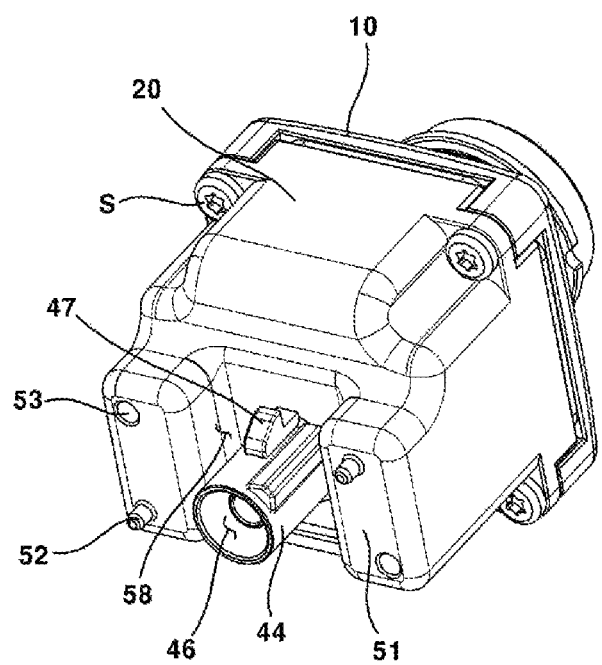
FIG. 6 is a perspective view showing the rear surface of a rear case according to the embodiment of the present invention.

FIG. 6 is a perspective view showing the rear surface of a rear case according to the embodiment of the present invention.

Referring to FIGS. 1 to 4, and 6, a terminal hole 46 for exposing the terminal 39 to the outside is formed on the rear surface of the rear case 20. In detail, a connector coupling portion 44 protruding rearward from the rear surface may be formed on the rear surface of the rear case 20. In addition, the terminal hole 46 may be disposed inside the connector coupling portion 44. The terminal 39 extending from the rear surface of the third substrate 36 is disposed in the terminal hole 46, so that the rear end portion of the terminal 39 may be exposed to the outside.

Meanwhile, the sealing part 6 coupled to the outer circumferential surface of the terminal 39 is disposed inner side of a protruded portion 42 protruding from the inner surface of the rear case 20, thereby preventing external foreign substances from entering the space portion 21 through the terminal hole 46. The sealing part 6 is formed of an elastic deformation material, and the inner surface thereof is in contact with an outer circumferential surface of the terminal 39, and the outer surface is in contact with an inner circumferential surface of the protruded portion 42, thereby shielding the space 21.

In addition, on an outer circumferential surface of the connector coupling portion 44, a coupling rib 47 protruding from the outer circumferential surface is formed so that the connector 90 may be hook-coupled. The coupling rib 47 may be provided in plural on the outer circumferential surface of the connector coupling portion 44, and may be disposed spaced apart from each other. In the connector 90, a separate coupling portion (not shown) may be disposed for hook-coupling with the coupling rib 47. In addition, in the connector 90, a connector terminal 92 inserted into the terminal hole 46, thereby contacting the rear end of the terminal 39, may be provided. Therefore, when the connector terminal 92 is in contact with the terminal 39, the connector 90 may be electrically connected to electronic components disposed in the space portion 21.

Meanwhile, a bracket 80 may be coupled to the rear surface of the rear case 20. The bracket 80 for fixing the position of the vehicle camera 100 in a region in which the vehicle camera 100 is installed, inside or outside the vehicle, comprises a bracket body 82 coupled to the rear of the rear case 20 and an extension portion 85 extending from both sides of the bracket body 82 to be formed with a screw hole 81 therein. The extension portion 85 may be bent at least once and disposed in parallel with the bracket body 82. Therefore, when the screw is coupled through the screw hole 81, the vehicle camera 100 can be fixed to the installation area.

And, in the peripheral region of the connector coupling portion 44 in the rear surface of the rear case 20, a bracket coupling portion 51 protruding rearward from the rear surface of the rear case 20 is formed so as to cover at least a portion of an outer circumferential surface of the connector coupling portion 44. The bracket coupling portion 51 may be provided in plural on both sides of the connector coupling portion 44 such that the connector coupling portion 44 is disposed therebetween. That is, the plurality of bracket coupling portions 51 may be disposed at one edge and other edge of the rear surface of the rear case 20 so as to face each other with respect to the connector coupling portion 44. Due to this, an area between the plurality of bracket coupling portions 51, that is, an area where the connector coupling portion 44 is formed, may have a groove shape due to the protruded height of the bracket coupling portion 51. That is, the rear of the vehicle camera 10 may be partitioned into: the rear surface of the bracket coupling portion 51 disposed at the rearmost side; and the rear surface of the rear case 20 formed on the bottom surface of a connector mounting groove 58 disposed between the bracket coupling portions 51. Meanwhile, the protruded height of the connector coupling portion 44 may be higher than the protruded height of the bracket coupling portion 41.

On the rear surface of the bracket coupling portion 51, a coupling hole 53 and a coupling protrusion 52 coupled with the bracket body 82 may be disposed. The coupling hole 53 is recessed forward from the rear surface of the bracket coupling portion 51, and a screw thread is provided on the inner circumferential surface so that the screw P is coupled thereto. In addition, the coupling protrusion 52 is formed protruded rearward from the rear surface of the bracket coupling portion 51. The coupling hole 53 and the coupling protrusion 52 are disposed in pairs in the bracket coupling portions 51, respectively. That is, in one bracket coupling portion 51, one coupling hole 53 and one coupling protrusion 52 may be disposed. And, the coupling holes 53 and the plurality of coupling protrusions 52 may be symmetrically disposed with respect to the terminal hole 46, respectively. That is, the virtual line connecting the plurality of coupling holes 53 and the virtual line connecting the plurality of coupling protrusions 52 may be formed in the shape of a letter 'X'.

In addition, a protruded portion 84 protruding from the front surface of the bracket body 82 is formed in an area of the front surface of the bracket body 82 facing the coupling hole 53. In addition, a through hole 86 penetrating the rear surface from the front surface of the bracket body 82 may be formed in an area of the front surface of the bracket body 82 facing the coupling protrusion 52. Therefore, when the bracket 80 is coupled to the rear case 20, the protruded portion 84 is coupled to the coupling hole 53, and the coupling protrusion 52 may be coupled to the through hole 86.

Meanwhile, the bracket coupling portion 51 is formed to be protruded from the rear surface of the rear case 20, and the coupling hole 53 is formed in the bracket coupling portion 51, so that the space portion 21 may secure a wider area. That is, the length of the coupling hole 53 may correspond to the protruded height of the bracket coupling portion 51. This is because the coupling hole 53 is extended forward from the rear surface of the bracket coupling portion 51, there is an advantage of securing a larger area for arranging parts in the inner space than forming the entire rear surface of the rear case 20 to be flat.

By forming the area between the bracket coupling portions 51, that is, the area where the connector coupling portion 44 is disposed, lower than the bracket coupling portion 51 forming area, there is an advantage of reducing the overall size of the product.

In addition, a connector mounting hole 83 is formed in an area of the bracket body 82 facing the connector coupling portion 44, so that the connector coupling portion 44 may be protruded rearward through the connector mounting hole 83. That is, the connector mounting hole 83 may be disposed on the bracket body 82 such that the connector 90 and the connector coupling portion 44 do not interfere with the bracket body 82. The connector mounting hole 83 may be formed by cutting a portion of the bracket body 82.

According to the configuration as described above, since the bracket coupling portion 51 surrounds the peripheral region of the connector coupling portion 44, there is an advantage of protecting the connector coupling portion 44 and the connector 90 from external impact. Due to this, the coupling of the connector coupling portion 44 and the connector 90 can be firmly fixed.

In the above, to have been described as all the components that make up the embodiments of the present invention may operate in combination, or combined into one, the present invention is not necessarily limited to all the components of the embodiments. In other words, within the scope of the purpose of this invention, all of those components may operate in selective combinations of one or more components. In addition, the term "comprise", "comprise", or "have" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being comprised in the scope of the present invention.

The invention claimed is:

1. A camera comprising:
 a case comprising a front case and a rear case coupled to the first case;
 a substrate module disposed in the case; and
 a terminal electrically connected to the substrate module and extending toward a rear side of the substrate module,
 wherein the rear case comprises a rear plate and a lateral plate extending from the rear plate and coupled to the front case,
 wherein the rear case comprises a bracket coupling portion comprising first and second bracket coupling portions and a connector coupling portion formed on a recessed portion of the rear plate between the first and second bracket coupling portions, and
 wherein the bracket coupling portion is integrally formed with the connector coupling portion.

2. The camera of claim 1, wherein a surface of at least one of the first and second bracket coupling portions is disposed on a same plane surface with an outer surface of the lateral plate of the rear case.

3. The camera of claim 1, wherein a part of the bracket coupling portion straightly extends from the lateral plate of the rear case.

4. The camera of claim 1, wherein at least a part of the connector coupling portion is disposed between the first and second bracket coupling portions in a direction perpendicular to an optical axis direction.

5. The camera of claim 1, wherein the connector coupling portion comprises a terminal hole for exposing the terminal to outside, and
 wherein the bracket coupling portion is disposed adjacent to the connector coupling portion and covers at least a portion of an outer circumferential surface of the connector coupling portion.

6. The camera of claim 1, wherein the connector coupling portion protrudes toward a rear side from the rear plate of the rear case, and
 wherein, based on the recessed portion of the rear plate, a protruding height of the connector coupling portion is formed higher than a protruding height of the bracket coupling portion.

7. The camera of claim 1, wherein the connector coupling portion is formed in a shape of a cylinder.

8. The camera of claim 1, wherein a rear surface of the bracket coupling portion is parallel to a rear surface of the recessed portion of the rear plate.

9. The camera of claim 1, wherein the rear plate of the rear case is provided with a bracket for coupling with an installation area of a vehicle, and
 wherein the bracket comprises a bracket body coupled to a rear surface of the bracket coupling portion and an extension portion extending from both sides of the bracket body and comprising a screw hole.

10. The camera of claim 9, wherein the bracket body comprises a connector mounting hole penetrated by the connector coupling portion, and a plate portion overlapped with the first and second bracket coupling portions in an optical axis direction.

11. The camera of claim 10, wherein the bracket coupling portion comprises a coupling protrusion protruding from the rear surface of the bracket coupling portion and a coupling hole recessed toward a front side from the rear surface of the bracket coupling portion, and
 wherein the bracket body comprises a through hole formed on a front surface of the plate portion of the bracket body facing the bracket coupling portion and coupled with the coupling protrusion and a protrusion portion inserted to the coupling hole of the bracket coupling portion.

12. The camera of claim 1, wherein the first and second bracket coupling portions are disposed on a first imaginary line perpendicular to an optical axis, and
 wherein the bracket coupling portion is not disposed on a second imaginary line perpendicular to the optical axis and the first imaginary line.

13. The camera of claim 1, comprising a connector coupled to the connector coupling portion and electrically connected to the terminal.

14. The camera of claim 13, wherein the connector coupling portion comprises a coupling rib protruding from an outer circumferential surface of the connector coupling portion, and
 wherein the connector is hook-coupled to the coupling rib.

15. A vehicle comprising the camera of claim 1.

16. A camera comprising:
 a case comprising a front case and a rear case coupled to the first case;
 a substrate disposed in the case; and
 a terminal electrically connected to the substrate and extending toward a rear side of the substrate,
 wherein the rear case comprises a rear plate and a lateral plate extending from the rear plate and coupled to the front case,
 wherein the rear case comprises a bracket coupling portion comprising first and second bracket coupling portions and a connector coupling portion disposed between the first and second bracket coupling portions, and
 wherein the connector coupling portion is integrally formed with the rear plate of the rear case.

17. The camera of claim 16, wherein the bracket coupling portion is integrally formed with the rear case.

18. The camera of claim 16, wherein a part of the bracket coupling portion straightly extends from the lateral plate of the rear case.

19. The camera of claim 16, wherein a surface of at least one of the first and second bracket coupling portions is disposed on a same plane surface with an outer surface of the lateral plate of the rear case.

20. A camera comprising:
 a case comprising a front case and a rear case coupled to the first case;

a substrate module disposed in the case; and a terminal electrically connected to the substrate module and extending toward a rear side of the substrate module, wherein the rear case comprises a rear plate and a lateral plate extending from the rear plate and coupled to the front case, wherein the rear case comprises a bracket coupling portion comprising first and second bracket coupling portions and a connector coupling portion formed on a recessed portion of the rear plate between the first and second bracket coupling portions, and wherein the bracket coupling portion is integrally formed with the rear plate and the lateral plate of the rear case.

\* \* \* \* \*